(12) United States Patent
Timberlake et al.

(10) Patent No.: US 8,357,738 B2
(45) Date of Patent: Jan. 22, 2013

(54) FLAME RETARDANT HALOGENATED PHENYL ETHER BLENDS

(75) Inventors: Larry D. Timberlake, West Lafayette, IN (US); James D. Siebecker, West Lafayette, IN (US)

(73) Assignee: Chemtura Corporation, Middlebury, CT (US)

( * ) Notice: Subject to any disclaimer, the term of this patent is extended or adjusted under 35 U.S.C. 154(b) by 139 days.

(21) Appl. No.: 12/624,497

(22) Filed: Nov. 24, 2009

(65) Prior Publication Data

US 2010/0160516 A1    Jun. 24, 2010

Related U.S. Application Data

(60) Provisional application No. 61/139,282, filed on Dec. 19, 2008.

(51) Int. Cl.
*C08K 5/06* (2006.01)

(52) U.S. Cl. ........ 524/371; 252/609; 524/370; 524/379; 524/380; 524/381; 524/384; 524/391; 524/464; 524/466; 524/469; 524/471; 524/473; 524/571; 524/575; 524/577; 524/578; 526/340; 526/342; 526/346; 526/347; 526/347.1; 568/639; 568/645; 568/647; 568/656; 568/661; 568/663; 570/182; 570/183; 570/252; 570/261

(58) Field of Classification Search .................. 252/609; 524/370, 371, 379, 380, 381, 384, 391, 464; 524/466, 469, 471, 473, 571, 575, 577, 578; 526/340, 342, 346, 347, 347.1; 568/639; 568/645, 647, 656, 661, 663; 570/182, 183, 570/252, 261

See application file for complete search history.

(56) References Cited

U.S. PATENT DOCUMENTS

| | | | |
|---|---|---|---|
| 3,760,003 A | 9/1973 | Asadorian et al. | |
| 4,258,175 A | 3/1981 | Chen | |
| 5,112,897 A * | 5/1992 | Dever et al. | 524/412 |
| 5,530,044 A | 6/1996 | Mack et al. | |
| 8,158,038 B2 * | 4/2012 | Timberlake et al. | 252/609 |
| 2007/0093582 A1 * | 4/2007 | Dawson et al. | 524/411 |
| 2008/0269416 A1 | 10/2008 | Timberlake et al. | |
| 2011/0028626 A1 * | 2/2011 | Timberlake et al. | 524/370 |
| 2011/0184107 A1 * | 7/2011 | Timberlake | 524/371 |
| 2012/0065297 A1 * | 3/2012 | Timberlake et al. | 523/456 |

FOREIGN PATENT DOCUMENTS

JP    2129137    5/1990

OTHER PUBLICATIONS

Dhanesar et al. "Synthesis and Stationary Phase Properties of Bromo Phenyl Ethers", Journal of Chromatography, 267 (1983), pp. 293-301.

* cited by examiner

*Primary Examiner* — Richard A Huhn
(74) *Attorney, Agent, or Firm* — Joseph Suhadolnik

(57) ABSTRACT

A flame retardant blend comprises at least first and second halogenated non-polymeric phenyl ethers having the general formula (I):

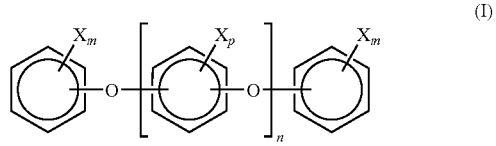

wherein each X is independently Cl or Br, each m is independently an integer of 1 to 5, each p is independently an integer of 1 to 4, n is an integer of 1 to 5 and wherein the values of n for the first and second ethers are different.

24 Claims, No Drawings

FLAME RETARDANT HALOGENATED PHENYL ETHER BLENDS

CROSS REFERENCE TO RELATED APPLICATIONS

This application claims the benefit of the filing date of U.S. Provisional Application No. 61/139,282 filed Dec. 19, 2008, the entire contents of which are incorporated herein by reference.

FIELD

This invention relates to flame retardant halogenated phenyl ether blends.

BACKGROUND

Decabromodiphenyl oxide (deca) and decabromodiphenylethane (deca-DPE) are commercially available materials widely used to flame retard various polymer resin systems. The structure of these materials is as follows:

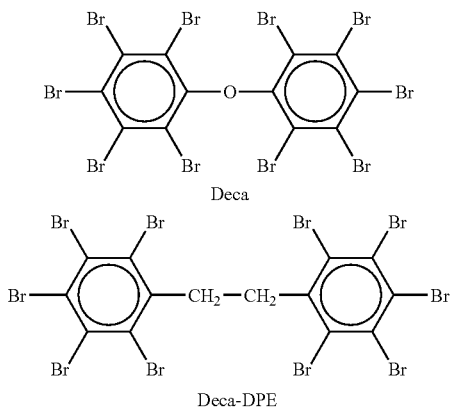

One of the advantages of using deca and deca-DPE in polymer resins that are difficult to flame retard, such as high-impact polystyrene (HIPS) and polyolefins, is that the materials have a very high (82-83%) bromine content. This allows a lower load level in the overall formulation, which in turn serves to minimize any negative effects of the flame retardant on the mechanical properties of the polymer.

Despite the commercial success of deca, there remains significant interest in developing alternative halogenated flame retardant materials that are equally or more efficient, not only because of economic pressures but also because they may allow lower flame retardant loadings, which in turn may impart improved performance properties. Improved properties, such as non-blooming formulations, or better mechanical properties can potentially be met by producing polymeric or oligomeric flame retardant compounds. These types of materials tend become entangled in the base resin polymer matrix, depending on the compatibility between the resin and the flame retardant, and hence should show fewer tendencies to bloom.

There are a number of commercially available flame retardant materials that can be considered oligomers or polymers of halogenated monomers. Examples of these monomers include tetrabromobisphenol A (TBBPA) and dibromostyrene (DBS), which have the following structures:

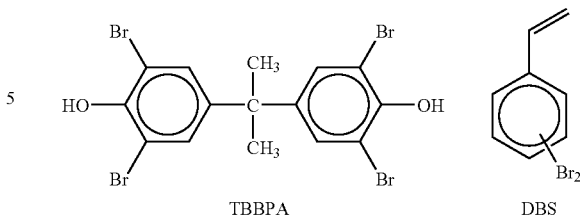

Commercially, TBBPA and DBS are typically not used in their monomeric form, but are converted into an oligomeric or polymeric species. One class of oligomers is the brominated carbonate oligomers based on TBBPA. These are commercially available from Chemtura Corporation (examples include Great Lakes BC-52™, Great Lakes BC-52HP™, and Great Lakes BC-58™) and by Teijin Chemical (FireGuard 7500 and FireGuard 8500). These products are used primarily as flame retardants for polycarbonate and polyesters.

Brominated epoxy oligomers, based on condensation of TBBPA and epichlorohydrin, are commercially available and sold by Dainippon Ink and Chemicals under the Epiclon® series, and also by ICL Industrial Products (examples are F-2016 and F-2100) and other suppliers. The brominated epoxy oligomers find use as flame retardants for various thermoplastics both alone and in blends with other flame retardants.

Another class of brominated polymeric flame retardants based on TBBPA is exemplified by Teijin FG-3000, a copolymer of TBBPA and 1,2-dibromoethane. This aralkyl ether finds use in ABS and other styrenic polymers. Alternative end-groups, such as aryl or methoxy, on this polymer are also known as exemplified by materials described in U.S. Pat. No. 4,258,175 and U.S. Pat. No. 5,530,044. The non-reactive end-groups are claimed to improve the thermal stability of the flame retardant.

TBBPA is also converted into many other different types of epoxy resin copolymer oligomers by chain-extension reactions with other difunctional epoxy resin compounds, for example, by reaction with the diglycidylether of bisphenol A. Typical examples of these types of epoxy resin products are D.E.R.™ 539 by the Dow Chemical Company, or Epon™ 828 by Hexion Corporation. These products are used mainly in the manufacture of printed circuit boards.

DBS is made for captive use by Chemtura Corporation and is sold as several different polymeric species (Great Lakes PDBS-80™, Great Lakes PBS-64HW™, and Firemaster CP44-HF™) to make poly(bromostyrene) type flame retardants. These materials represent homopolymers or copolymers. Additionally, similar brominated polystyrene type flame retardants are commercially available from Albemarle Chemical Corporation (Saytex® HP-3010, Saytex® HP-7010, and PyroChek 68PB). All these polymeric products are used to flame retard thermoplastics such as polyamides and polyesters.

Unfortunately, one of the key drawbacks of the existing halogenated polymer materials is their relatively low halogen content, which makes them less efficient as flame retardants and consequently typically has a negative effect on the desirable physical properties of the flame retardant formulations containing them, such as impact strength. For example, whereas deca and deca-DPE contain 82-83% bromine, oligomers or polymers based on the brominated monomers mentioned above generally have a bromine content in the range of 52%-68%, depending on the material. This therefore typically requires a flame retardant loading level in a polymer formulation significantly higher than that required for deca, often resulting in inferior mechanical properties for the formulation.

In our U.S. Patent Application Publication No. 2008/0269416, we have proposed a new class of flame retardant materials that to not detract from the mechanical properties of the target resin and that are based on halogenated aryl ether oligomers comprising the following repeating monomeric units:

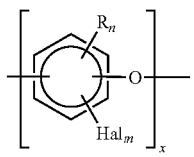

wherein R is hydrogen or alkyl, especially $C_1$ to $C_4$ alkyl, Hal is halogen, normally bromine, m is at least 1, n is 0 to 3 and x is at least 2, such as 3 to 100,000. These materials can be halogenated to a higher level than other currently available oligomeric flame retardants and provide superior mechanical properties when combined with resins such as HIPS and polyolefins as well as engineering thermoplastics such as polyamides and polyesters. It is also found that these aryl ether oligomers, even at lower levels of halogenation, give formulations with acceptable mechanical properties.

The materials disclosed in the '416 publication are polymeric in the sense that they have a molecular weight distribution resulting from the varying degrees of polymerization of the monomer units. According to the invention, we have now found that certain discrete halogenated phenyl ether compounds, which have multiple phenyloxy linkages but which are not polymeric in the sense that they do not have a molecular weight distribution, have utility as flame retardants. Moreover, when blended with analogues having different numbers of phenyloxy linkages and formulated into polymer resins, such as high-impact polystyrene, these materials provide flame retarded resin compositions having similarly improved physical properties, as obtained with their polymeric counterparts.

Japanese Unexamined Patent Application Publication 2-129,137 discloses flame retardant polymer compositions in which the polymer is compounded with a halogenated bis(4-phenoxyphenyl)ether shown by general formula [I]:

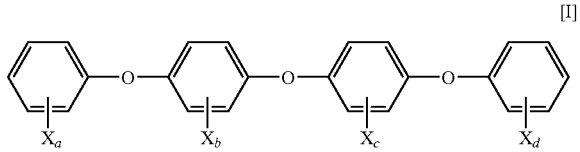

in which X is a halogen atom, a and d are numbers in the range of 1-5, and b and c are numbers in the range of 1-4. Various levels of bromination are discussed in this application, but there is no disclosure of blending the halogenated ether with materials having different numbers of phenoxy groups. Also it will be seen that all the phenoxy groups in the compound of formula [I] are linked to the adjacent phenyl group in the 4- or para-position.

U.S. Pat. No. 3,760,003 discloses halogenated polyphenyl ethers having the general formula:

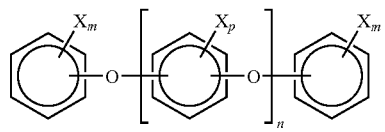

wherein each X is independently Cl or Br, each m is independently an integer of 0 to 5, each p is independently an integer of 0 to 4, n is an integer of 2 to 4, and 50% or more by weight of the compound is halogen. The ether linkages on the non-terminal phenyl groups can be in the meta or para position and the materials are said to be flame retardants for a wide variety of polymer resins. Again, however, there is no reference to blending ethers with different n values.

In an article entitled "Synthesis and Stationary Phase Properties of Bromo Phenyl Ethers", *Journal of Chromatography*, 267 (1983), pages 293-301, Dhanesar et al disclose a process for the site-specific bromination of phenyl ethers containing from 2 to 7 benzene rings. The ethers appear to be discrete compounds with no oligomeric distribution and, although the products are said to be useful in the separation of organic compounds, no reference is given to their possible use as flame retardants.

SUMMARY

In one aspect, the present invention resides in a flame retardant blend comprising at least first and second halogenated non-polymeric phenyl ethers having the general formula (I):

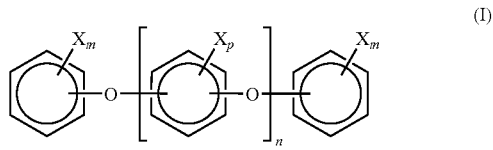

(I)

wherein each X is independently Cl or Br, each m is independently an integer of 1 to 5, each p is independently an integer of 1 to 4, n is an integer of 1 to 5 and wherein the values of n for the first and second ethers are different.

Conveniently, the halogen content of each halogenated non-polymeric phenyl ether is in the range of about 50 to about 83 wt %, such as in the range of about 65 to about 80 wt %, of the ether. Generally, the halogen comprises bromine.

Conveniently, the value of n for each halogenated non-polymeric phenyl ether is an integer of 1 to 3.

In one embodiment, at least one, and preferably each, non-terminal phenyl group of one or both of said first and second halogenated non-polymeric phenyl ethers is connected to two phenoxy groups in the 1,4-positions.

In another embodiment, at least one, and preferably each, non-terminal phenyl group of one or both of said first and second halogenated non-polymeric phenyl ethers is connected to two phenoxy groups in the 1,2-positions.

In yet another embodiment, at least one, and preferably each, non-terminal phenyl group of one or both of said first and second halogenated non-polymeric phenyl ethers is connected to two phenoxy groups in the 1,3-positions.

Conveniently, the blend includes at least a third halogenated non-polymeric phenyl ether having the general formula (I), preferably such that the value of n for the first ether is 1, the value of n for the second ether is 2 and the value of n for the third ether is 3. In one embodiment, such a three component blend comprises about 30 wt % to about 60 wt % of said first ether, about 30 wt % to about 60 wt % of said second ether and about 1 wt % to about 15 wt % of said third ether.

In a further aspect, the present invention resides in a flame retardant polymer composition comprising (a) a flammable macromolecular material and (b) a flame retardant blend comprising at least first and second halogenated non-polymeric phenyl ethers having the general formula (I):

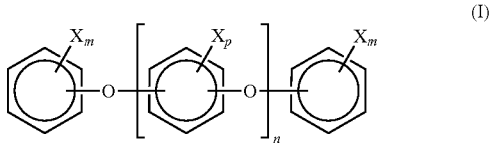

wherein each X is independently Cl or Br, each m is independently an integer of 1 to 5, each p is independently an integer of 1 to 4, n is an integer of 1 to 5 and wherein the values of n for the first and second ethers are different.

Conveniently, the flammable macromolecular material (a) is a thermoplastic polymer or a thermosetting polymer.

In one embodiment, the flammable macromolecular material (a) is polystyrene and the amount of halogenated aryl ether oligomer flame retardant in the composition is between about 5 and 25 wt %, such as between about 10 and 20 wt %.

In another embodiment, the flammable macromolecular material (a) is polypropylene and the amount of halogenated aryl ether oligomer flame retardant in the composition is between about 20 and 50 wt %, such as between about 25 and 40 wt %.

In a further embodiment, the flammable macromolecular material (a) is polyethylene and the amount of halogenated aryl ether oligomer flame retardant in the composition is between about 5 and 35 wt %, such as between about 20 and 30 wt %.

In a further embodiment, the flammable macromolecular material (a) is a polyamide or a polyester and the amount of halogenated aryl ether oligomer flame retardant in the composition is between about 5 and 25 wt %, such as between about 10 and 20 wt %.

Alternatively, the flammable macromolecular material (a) is a thermosetting polymer, such as an epoxy resin, an unsaturated polyester, a polyurethane and/or a rubber.

DESCRIPTION OF THE EMBODIMENTS

Described herein is a blend of at least two halogenated non-polymeric phenyl ethers and the use of the blend as a flame retardant for flammable macromolecular polymers. Suitable macromolecular polymers include thermoplastic polymers, such as polystyrene, poly (acrylonitrile butadiene styrene), polycarbonates, polyolefins, polyesters and polyamides, and thermosetting polymers, such as epoxy resins, unsaturated polyesters, polyurethanes and rubbers.

The term "non-polymeric phenyl ether" is used herein to mean a compound which has a fixed number of aryloxy linkages and hence a discrete molecular weight. This is in contrast to an aryl ether polymer or oligomer which has a molecular weight distribution resulting from the varying degrees of polymerization of its aryl ether monomer units.

Each halogenated non-polymeric phenyl ether employed in the present blend has the general formula (I):

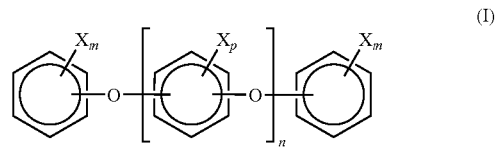

wherein each X is independently Cl or Br, each m is independently an integer of 1 to 5, typically 2 to 4, each p is independently an integer of 1 to 4, typically 3 or 4, and n is an integer of 1 to 5, typically from 1 to 3, and wherein the values of n for the first and second ethers are different.

Generally, the halogen content of the present halogenated aryl ether oligomer is in the range of about 50 to about 83 wt %, such as in the range of about 65 to about 80 wt % of the oligomer. Preferably, the halogen X is bromine Conveniently, the flame retardant blend used herein comprises at least a third halogenated non-polymeric phenyl ether having the general formula (I) and a value for n different from those of the first and second ethers. Thus, in one embodiment, the value of n for the first ether is 1, the value of n for the second ether is 2 and the value of n for the third ether is 3. Typically, such a three component blend comprises about 30 wt % to about 60 wt % of said first ether, about 30 wt % to about 60 wt % of said second ether and about 1 wt % to about 15 wt % of said third ether. In a preferred embodiment, the three component blend comprises about 42 wt % to about 48 wt % of said first ether, about 42 wt % to about 48 wt % of said second ether and about 8 wt % to about 12 wt % of said third ether.

In each of the non-polymeric phenyl ethers employed in the present blend, the phenoxy groups attached to the non-terminal phenyl groups may be totally or partially in the 1,4 (para)-position, the 1,3 (meta)-position or the 1,2 (ortho) position. For example, for a 3-ring phenyl ether (n is 1 in formula I), 2 configurations, para (3p), meta (3m) and ortho (3o), are possible for the phenoxy groups attached to the single non-terminal phenyl group:

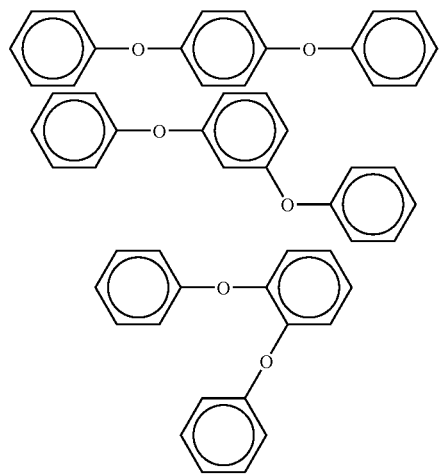

In the case of a 4-ring phenyl ether (n is 2 in formula I), 6 configurations, 4pp, 4pm, 4mm, 4po, 4mo and 4oo, are possible. Considering, for simplicity only the para and meta configurations, these are as follows:

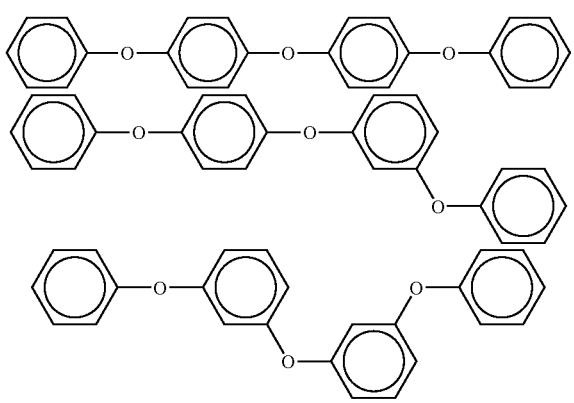

Again considering only the para and meta configurations, in the case of a 5-ring phenyl ether (n is 3 in formula I), 6 configurations, 5ppp, 5ppm, 5pmp, 5pmm, 5mpm, and 5mmm, are possible:

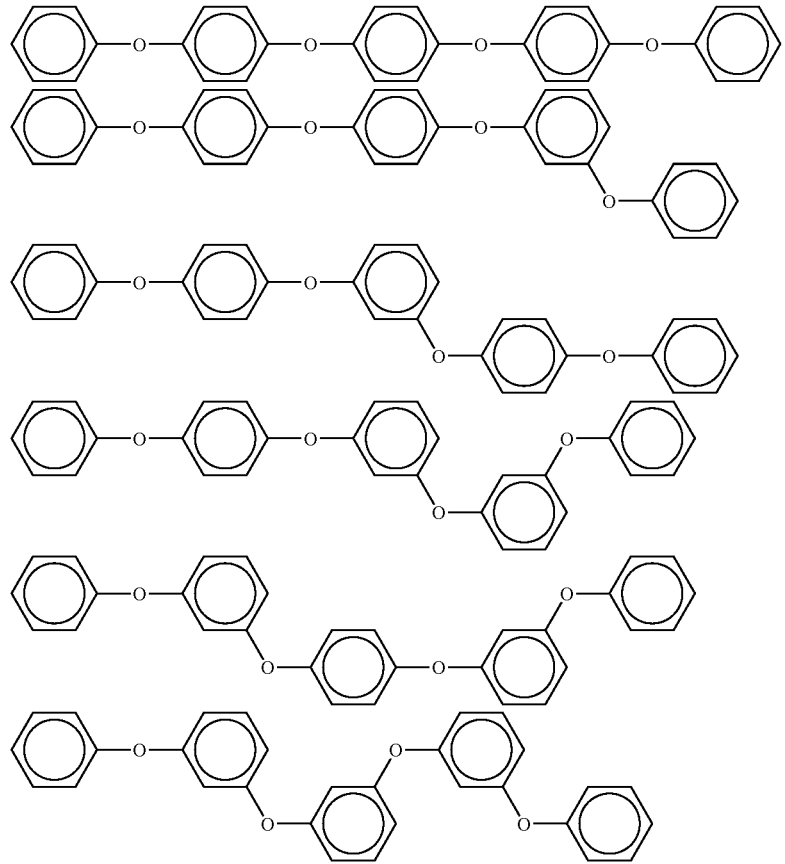

For simplicity, the halogen substituents in the phenyl ether configurations shown above are omitted.

In the case of a 6-ring phenyl ether (n is 4 in formula I), 10 configurations, 6pppp, 6pppm, 6ppmp, 6ppmm, 6pmpm, 6pmmp, 6mppm, 6pmmm, 6mpmm, and 6mmmm, are possible for just the para- and meta-containing structures, although are not drawn out here. Similarly, in the case of a 7-ring phenyl ether (n is 5 in formula I), 16 configurations, 7ppppp, 7ppppm, 7pppmp, 7ppmpp, 7pppmm, 7ppmpm, 7ppmmp, 7pmppm, 7ppmmm, 7pmpmm, 7mppmm, 7mpmpm, 7pmmmm, 7mpmmm, 7mmpmm, and 7mmmmm are possible for just the para- and meta-containing structures. In both cases, significantly more configurations are available when the ortho-containing structures are also included.

Each halogenated non-polymeric phenyl ether employed in the present blend is produced by halogenation, normally bromination, of its associated phenyl ether precursor, which in turn can be made from the appropriate aryl halide and aryl hydroxyl compounds by the Ullmann aryl ether synthesis.

Bromination of the resultant phenyl ether precursor is readily achieved by the reaction of the phenyl ether with bromine in the presence of a Lewis acid catalyst, such as aluminum chloride. Depending on the amount of bromine desired to be introduced into the phenyl ether, the weight ratio of bromine to oligomer employed in the bromination reaction is typically between about 1:1 and about 100:1, such as between about 3:1 and about 20:1. The final brominated phenyl ether is generally arranged to have at least one, and typically between 2 and 4 bromine atoms per internal phenyl group and between 2 and 5 bromine atoms on each end phenyl group.

Alternatively, bromine chloride may be used as the brominating agent to generate the desired product in similar fashion. In this case, a small amount of organically-bound chlorine would also be present, but would not detract from the properties of the final flame retardant.

Bromination can be conducted on each phenyl ether individually and then the brominated materials combined in the required proportions to produce the desired flame retardant blend. Alternatively, a blend of the different phenyl ether precursors can be produced and then bromination conducted on the resultant blend.

The resultant halogenated phenyl ether blend can be used as a flame retardant for many different polymer resin systems because of its high thermal stability and also because of its relatively high halogen content compared with existing polymeric flame retardant products, such as brominated polystyrenes. Generally, the halogenated phenyl ether blend is employed as a flame retardant with thermoplastic polymers, such as polystyrene, high-impact polystyrene (HIPS), poly(acrylonitrile butadiene styrene) (ABS), polycarbonates (PC), PC-ABS blends, polyolefins, polyesters and/or polyamides. With such polymers, the level of the halogenated phenyl ether blend in the polymer formulation required to give a V-0 classification when subjected to the flammability test protocol from Underwriters Laboratories is generally within the following ranges:

| Polymer | Useful | Preferred |
|---|---|---|
| Polystyrene | 5 to 25 wt % | 10 to 20 wt % |
| Polypropylene | 20 to 50 wt % | 25 to 40 wt % |
| Polyethylene | 5 to 35 wt % | 20 to 30 wt % |
| Polyamide | 5 to 25 wt % | 10 to 20 wt % |
| Polyester | 5 to 25 wt % | 10 to 20 wt %. |

The present halogenated phenyl ether blend can also be used with thermosetting polymers, such as epoxy resins, unsaturated polyesters, polyurethanes and/or rubbers. Where the base polymer is a thermosetting polymer, a suitable flammability-reducing amount of the phenyl ether blend is between about 5 wt % and about 35 wt %, such as between about 10 wt % and about 25 wt %.

Typical applications for polymer formulations containing the present halogenated phenyl ether blend as a flame retardant include automotive molded components, adhesives and sealants, fabric back coatings, electrical wire and cable jacketing, and electrical and electronic housings, components and connectors. In the area of building and construction, typical uses for the present flame retardant blend include self extinguishing polyfilms, wire jacketing for wire and cable, backcoating in carpeting and fabric including wall treatments, wood and other natural fiber-filled structural components, roofing materials including roofing membranes, roofing composite materials, and adhesives used to in construction of composite materials. In general consumer products, the present flame retardant blend can be used in formulation of appliance parts, housings and components for both attended and unattended appliances where flammability requirements demand.

The invention will now be more particularly described with reference to the following non-limiting Examples.

EXAMPLES 1 and 2

Synthesis of Brominated 3p Phenyl Ether 1,4-diphenoxybenzene is prepared by the Ullmann ether synthesis as follows. 4-Phenoxyphenol (186.2 g, 1.0 mol) is dissolved in 1600 g of DMF with 300 mL toluene under nitrogen. A 50% KOH solution (112.0 g, 1.0 mol) is added followed by azeotropic removal of the water and stripping of the toluene. Bromobenzene (157.0 g, 1.0 mol) and cupric oxide (3.2 g, 0.04 mol) are then added and the reaction solution held at reflux (153° C.) for 24 hr. The DMF is then removed by stripping and the residue worked up to give 1,4-diphenoxybenzene Bromine (640.6 g) is added to a solution of 107.8 g of 1,4-diphenoxybenzene in 500 mL of dichloromethane containing 9.6 g of AlCl$_3$ catalyst. The reaction temperature is kept at 30° C. and the HBr off-gas is captured in a water trap. After the HBr evolution subsides, the material is worked up to give the product as an off-white solid. The material is analyzed to contain 72.6% bromine.

EXAMPLE 3

Synthesis of Brominated 3m Phenyl Ether

The process of Example 1 is repeated but with the 4-phenoxyphenol being replaced by 3-phenoxyphenol.

EXAMPLES 4 to 11

Synthesis of Various Brominated Phenyl Ether Compounds

A similar procedure to that described in Example 1 is employed using the appropriate starting material substrate to generate the desired brominated aryl ether compounds, as shown in Table 1. For the blended samples, the aryl ethers are blended prior to bromination.

EXAMPLE 12

Compounding of Brominated Phenyl Ethers in HIPS Resin

The brominated phenyl ethers prepared in Examples 1 to 11 were compounded both separately and as blends with HIPS (high impact polystyrene) resin formulations containing antimony oxide (ATO) synergist using a twin-screw extruder with barrel temperatures of 200 to 220° C. For comparison, a similar formulation was prepared using decabromodiphenyl oxide ("deca") as the flame retardant. The resultant formulations were injection-molded into test bars and evaluated as shown in Table 1. The Izod Notched Impact Strength (N-Impact in Table 1) values were measured according to ASTM D-256.

TABLE 1

| | | | HIPS Results | |
|---|---|---|---|---|
| | Brominated Aryl Ether | | N-Impact | |
| Example | Structure | % Br | ft-lb/in | UL-94 |
| Deca | 2 | 83 | 2.1 | V-0 |
| 1 | 3p | 72.6 | 2.8 | V-0 |
| 2 | 3p | 74.2 | 3.0 | V-0 |
| 3 | 3m | 72.4 | 3.3 | V-0 |
| 2 + 3 | 3m/3p blend (80/20) | 76.0 | 3.0 | V-0 |
| 4 | 4pp | 70.8 | 2.3 | V-0 |
| 5 | 4pp | 75.1 | 2.8 | V-0 |
| 6 | 4mp | 74.7 | 2.9 | V-0 |
| 7 | 4mp | 70.7 | 3.0 | V-0 |
| 8 | 5ppp | 75.3 | 0.8 | V-0 |
| 9 | 5pmp | 75.3 | 1.2 | V-0 |
| 10 | 5mmm | 73.1 | 2.6 | V-0 |
| 11 | 6mmmm | 74.8 | 2.8 | V-2* |
| 1 + 4 + 8 | 3p/4pp/5ppp blend (30 wt %/40 wt %/30 wt %) | 75.7 | 1.7 | V-0 |
| 1 + 4 + 8 | 3p/4pp/5ppp blend (45 w %/45 wt %/10 wt %) | 71.7 | 2.7 | V-0 |

TABLE 1-continued

|  |  |  | HIPS Results | |
|---|---|---|---|---|
| Brominated Aryl Ether | | | N-Impact | |
| Example | Structure | % Br | ft-lb/in | UL-94 |
| 1 + 4 + 8 | 3p/4pp/5ppp blend (44 wt %/44 wt %/12 wt %) | 73.6 | 2.5 | V-0 |
| 1 + 4 + 8 | 3p/4pp/5ppp blend (48 wt %/47 wt %/5 wt %) | 72.7 | 2.5 | V-0 |

*Bromine content in formulation was slightly lower than calculated.

The results in Table 1 show that, for the individual phenyl ethers, as the number of phenyl rings increases, the impact strength of the formulation generally decreases. Similarly, for the individual phenyl ethers with a given number of phenyl rings, as the degree of meta substitution increases, the impact strength increases. For blends of phenyl ethers containing 3, 4 and 5-ring ethers, it is found that decreasing the amount of 5ppp material facilitates achieving the target impact strength target of >2.0 ft-lb/in.

EXAMPLE 13

Production and Testing of 3, 4 and 5-Ring Phenyl Ether Blends

Samples of 3-ring, 4-ring, and 5-ring para aryl ethers were each brominated by the same method as in Example 1 (using 1,2-dichloroethane or methylene chloride as the solvent) and isolated to give almost completely brominated products. The bromine contents for the samples are shown in Table 2. Additionally, a 45/45/10 wt % blend of the 3-ring, 4-ring, and 5-ring materials, respectively, was made and the resulting blend was brominated using the same solvent-based process. It will be seen that all samples made by this process contained a consistently high level of bromine at 79-80% bromine content.

TABLE 2

| Material | 3 Ring | 4 Ring | 5 Ring | 45/45/10 Blend |
|---|---|---|---|---|
| % Br | 79.6 | 79.5 | 78.8 | 79.8 |

Each of these materials was compounded in a high impact polystyrene (HIPS) resin formulation to give the same total bromine content (11.6% total bromine content). The compounded samples were injection molded into test bars and the following results were obtained (Table 3).

TABLE 3

| Sample | Notched Impact Strength, ft-lb.in. | Vicat, °C. (10N) | MFI, g/10 min (200° C., 5 Kg) |
|---|---|---|---|
| 3 Ring | 1.90 | 97.4 | 8.5 |
| 4 Ring | 1.35 | 97.5 | 8.8 |
| 5 Ring | 1.30 | 95.9 | 9.9 |
| 45/45/10 blend | 2.52 | 99.0 | 10.6 |

As shown from the data in Table 3, at a high level of bromination, a mixture or blend of the aryl ether oligomers helps to give an unexpected improvement in impact strength. Also, the flow properties and Vicat softening temperature were slightly increased. This demonstrates that with other variables constant, an improvement in the performance can be realized by using a blend of the brominated phenyl ethers as compared with a single pure component.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What we claim is:

1. A flame retardant polymer composition comprising:
   (a) a polystyrene resin, and
   (b) between about 5 and about 25 wt % based on the weight of the polymer composition of a flame retardant blend comprising halogenated non-polymeric phenyl ethers of general formula (I):

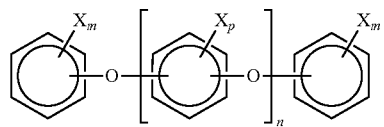

wherein X is Br, each m is independently an integer of 1 to 5, each p is independently an integer of 1 to 4, and n is an integer of 1 to 5,
   wherein said flame retardant blend comprises at least a first, second, and third ether of general formula (I) wherein the value of n for the first ether is 1, the value of n for the second ether is 2, the value of n for the third ether is 3, and at least one non-terminal phenyl group of the first, second, and third ether of general formula (I) is connected to two phenoxy groups in the 1,4-positions,
   wherein the blend comprises about 30 wt % to about 60 wt % of said first ether, about 30 wt % to about 60 wt % of said second ether, and about 1 wt % to about 15 wt % of said third ether,
   wherein the halogen content of each halogenated non-polymeric phenyl ether is in the range of about 65 to about 80 wt % of the ether.

2. The composition of claim 1, wherein, in formula I, n is an integer of 1 to 3.

3. The composition of claim 1, wherein the bromine content of the flame retardant blend is in the range of about 79 wt % to about 80 wt % of the blend.

4. The composition of claim 1, wherein the flame retardant blend comprises 5 wt % to 12 wt % of said third ether.

5. The composition of claim 4, wherein the flame retardant blend comprises 44 wt % to 48 wt % of said first ether, 44 wt % to 47 wt % of said second ether and 5 wt % to 12 wt % of said third ether.

6. The composition of claim 1, wherein the flame retardant blend comprises about 42 wt % to about 48 wt % of said first ether, about 42 wt % to about 48 wt % of said second ether and about 8 wt % to about 12 wt % of said third ether.

7. The composition of claim 1, wherein the first ether has a 3p configuration, the second ether has a 4 pp configuration and the third ether has a 5 ppp configuration.

8. The composition of claim 5, wherein the first ether has a 3p configuration, the second ether has a 4 pp configuration and the third ether has a 5 ppp configuration.

9. The composition of claim 6, wherein the first ether has a 3p configuration, the second ether has a 4 pp configuration and the third ether has a 5 ppp configuration.

10. The composition of claim 7, wherein the bromine content of each halogenated non-polymeric phenyl ether is in the range of about 65 to about 80 wt % of the ether.

11. The composition of claim 8, wherein the bromine content of each halogenated non-polymeric phenyl ether is in the range of about 65 to about 80 wt % of the ether.

12. The composition of claim 9, wherein the bromine content of each halogenated non-polymeric phenyl ether is in the range of about 65 to about 80 wt % of the ether.

13. The composition of claim 7, wherein the bromine content of the flame retardant blend is in the range of about 79 wt % to about 80 wt % of the blend.

14. The composition of claim 8, wherein the bromine content of the flame retardant blend is in the range of about 79 wt % to about 80 wt % of the blend.

15. The composition of claim 9, wherein the bromine content of the flame retardant blend is in the range of about 79 wt % to about 80 wt % of the blend.

16. The composition of claim 1, wherein the polystyrene resin comprises high impact polystyrene and/or poly (acrylonitrile butadiene styrene).

17. The composition of claim 5, wherein the polystyrene resin comprises high impact polystyrene and/or poly (acrylonitrile butadiene styrene).

18. The composition of claim 6, wherein the polystyrene resin comprises high impact polystyrene and/or poly (acrylonitrile butadiene styrene).

19. The composition of claim 7, wherein the polystyrene resin comprises high impact polystyrene and/or poly (acrylonitrile butadiene styrene).

20. The composition of claim 8, wherein the polystyrene resin comprises high impact polystyrene and/or poly (acrylonitrile butadiene styrene).

21. The composition of claim 9, wherein the polystyrene resin comprises high impact polystyrene and/or poly (acrylonitrile butadiene styrene).

22. The composition of claim 13, wherein the polystyrene resin high impact polystyrene and/or poly (acrylonitrile butadiene styrene).

23. The composition of claim 14, wherein the polystyrene resin comprises high impact polystyrene and/or poly (acrylonitrile butadiene styrene).

24. The composition of claim 15, wherein the polystyrene resin high impact polystyrene and/or poly (acrylonitrile butadiene styrene).

* * * * *